Sept. 7, 1965    J. W. BLAKELY    3,204,990
SWIVEL
Filed July 31, 1961
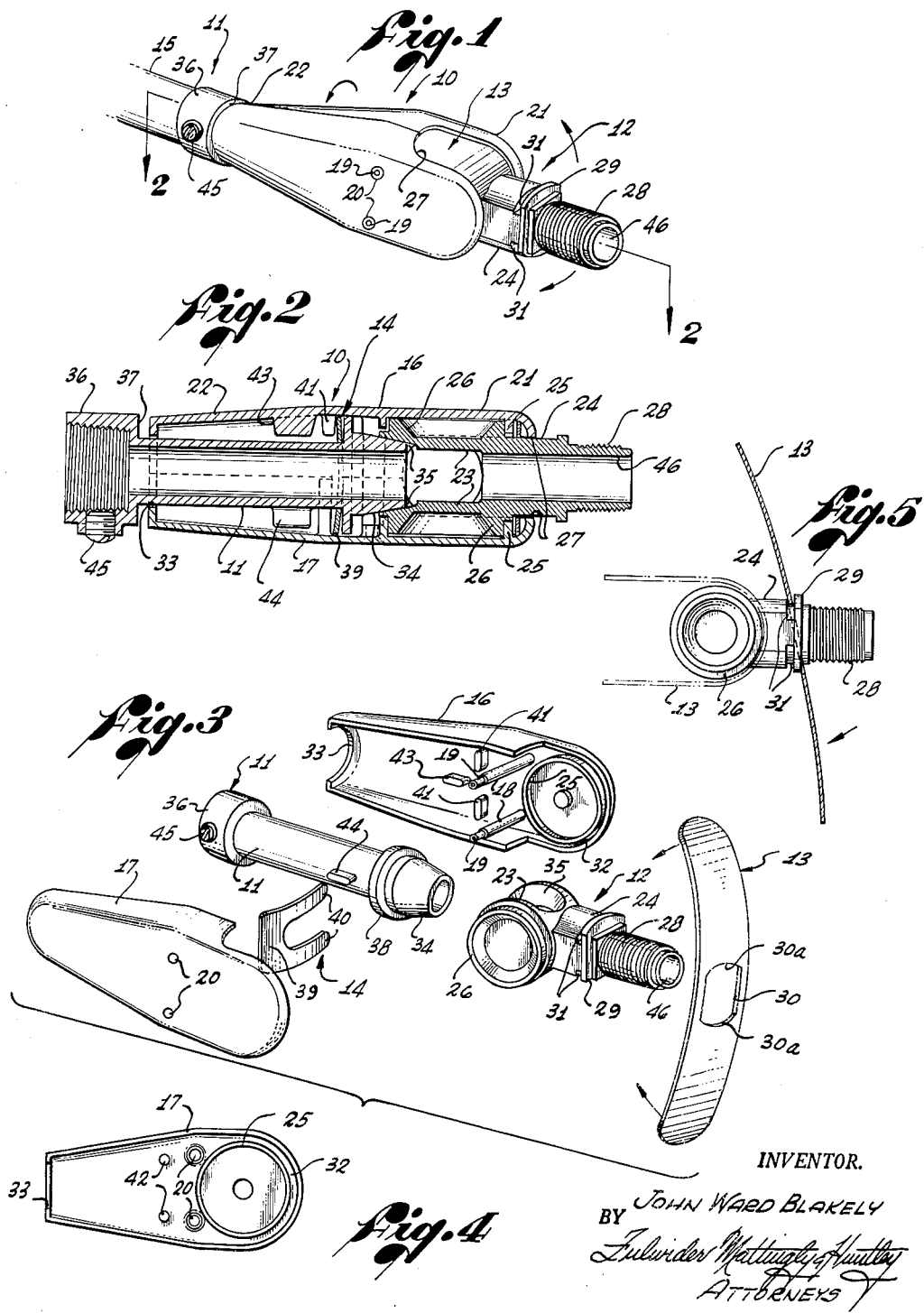
INVENTOR.
BY JOHN WARD BLAKELY
Zulinder Mattingly Huntley
ATTORNEYS

United States Patent Office 3,204,990
Patented Sept. 7, 1965

3,204,990
SWIVEL
John Ward Blakely, 3704 Mound View Ave.,
Glendale, Calif.
Filed July 31, 1961, Ser. No. 128,162
3 Claims. (Cl. 285—164)

The present invention relates generally to electrical fittings and more particularly to universal electric joints.

In one well known type of electric universal joint, a conduit supports a housing for rotation about the longitudinal axis of the conduit and the housing, in turn, supports a hollow stud for rotation on an axis that is angularly related to the axis of the conduit. United States Patent No. 2,617,619 of November 11, 1952 is illustrative of this general arrangement. Joints of this type have come into widespread use because they permit substatially 360° of relative rotation of the housing and conduit while simultaneously allowing substantially 180° of rotation of the stud relative to the housing. However, dissatisfaction has been encountered in the use of such joints due to the inefficiency of the means employed for maintaining the several parts of the joint in relatively adjusted positions. Usually, a friction brake type of mechanism is utilized. In some joints, the brake mechanism may take the form of an exteriorly adjustable means which can be loosened to allow movement of the parts to new positions after which the means are re-tightened. This type is inconvenient to use and is often ignored so that the part which it is desired to adjust to new position is moved while the brake is still applied, so causing excessive wear and loose contact of the frictionally engaged parts. In other types of brake mechanisms, no provision for selectively loosening and re-tightening the brake means is employed, reliance being placed on the durability of the rubbing surfaces of two or more relatively movable parts in order to provide a satisfactory service life for the joint, but without too much success.

An object of my invention is to provide an improved universal electric joint incorporating a brake or clamp mechanism for securely but yieldably holding the parts of the joint in relatively adjusted positions.

Another important object of the invention is to provide a self-adjusting brake means for an electric universal joint that will automatically compensate for wear which occurs on the frictionally engaged parts and, also, will compensate for variations in the parts due to manufacturing tolerances.

Yet another object of the invention is to provide a self-adjusting brake means for an electric universal joint that has a long service life of continuously reliable operation whereby it may be permanently concealed within the housing of the joint.

The invention also has for an object the provision of an electric universal joint employing a minimum number of readily assembled and easily formed parts and incorporating a self adjusting brake mechanism which aids in maintaining the housing, conduit and swivel member in snugly abutting relationship.

These and other objects and advantages of my invention will be apparent from the following description of a presently preferred embodiment thereof, when taken in conjunction with the annexed drawing.

FIGURE 1 is a perspective view of a presently preferred embodiment of a universal electric joint of my invention;

FIGURE 2 is a sectional view taken along the longitudinal axis of the joint;

FIGURE 3 is an exploded perspective view of the several parts of the joint;

FIGURE 4 is a plan view looking into one of the co-operating halves of the housing;

FIGURE 5 is an elevational view of the swivel member and closure strip for the slot in the housing and illustrating the manner of mounting such a strip on the swivel member.

Referring to the drawing for the general arrangement of invention and, in particular to FIGURE 2, the joint includes a housing 10 mounted coaxially on a tubular conduit member 11 so as to be rotatable relative to the conduit member through almost 360°. The conduit 11 has one end projecting through one end of the housing 10 and at the other end of the housing a member 12 is mounted for rotation through about 180° on an axis angularly related to and intersecting the axis of the conduit 11. The member 12 has a stud extending through a slot in the housing and mounts a flexible slot closure strip 13 that closes the slot in the housing in all adjusted positions of the stud. A relatively heavy spring 14 is disposed within the housing 10 and at all times forcefully biases confronting surfaces of the stud member 12 and conduit 11 together in order to inhibit relative movement of the housing 10, conduit 11 and member 12.

While a light fixture or the like, can be connected to either end of the joint, it is usual to mount the fixture on the member 12 and to mount the conduit member 11 in relatively fixed position, as is illustrated in FIGURE 1. Thus, a relatively fixed conduit stub 15 is shown in FIGURE 1 and it will be understood that the terminal end portions of a pair of conductors (not shown) extend through the stub and the housing 10, to be connected to a fixture mounted on the member 12. As the housing 10 is rotatable in clock-wise and counter clock-wise directions relative to the fixed conduit 11 throughout almost 360° and as the member 12 is capable of rotational movement relative to the housing 10 throughout substantially 180°, the fixture of the swivel member has a large sector on possible movement. In order to adjust the fixture to a desired position within the possible sector of movement, the fixture itself is grasped to provide a relatively large lever arm relative to the axis of rotation of the swivel member 12, and this force will be sufficient to overcome the braking force of the spring biased contacting surfaces of the swivel and conduit 11.

More particularly, the housing 10 comprises a pair of shells 16 and 17 that are similar in overall configuration. In the illustrated embodiment of the invention, the shell 16 is interiorly formed with a pair of inwardly extending posts or stakes 18 having reduced diameter ends 19 arranged for mating reception within a pair of spaced holes 20 formed in the other shell 17. When the shells 16 and 17 are initially placed together, the reduced diameter ends 19 initially protrude outwardly beyond the exterior surface of the shell 17 and are then upset whereby the integral housing 10 is formed. It will, of course, be understood that the permanent connection of the shell 16 and 17 in this fashion is accomplished as the last step in the assembly of the complete joint, after the conduit 11, spring 14, member 12 and strip 13 have been assembled.

Thus formed, the housing 10 has a relatively broad semi-cylindrical end 21 that tapers smoothly and continuously to a relatively narrow end 22. The member 12 is rotatably seated in the larger end 21 and preferably takes the form of a confronting pair of coaxially spaced apart circular disks 23 interconnected by an integral hollow stud 24 extending radially from the disks. As is shown in FIGURES 3 and 4, the shells 16 and 17 are identically formed with interiorly disposed cylindrical flanges 25 and the disks 23 of the swivel member 12, on their oppositely facing exterior sides, are formed with cylindrical flanges 26 that are matingly rotatably receivable within the flanges 25. The stud member 12 thus has a plain bearing support in the housing 10 and the hollow stud 24 extends outwardly of the housing through a slot 27 defined by confronting edges of the shells 16 and 17. As is best seen in FIGURE 1, the slot 27 is of sufficient length to permit reciprocation of the stud 24 throughout an arc of substantially 180°.

The hollow stud 24 may be of any configuration suitable for connection to the particular fixture to be connected to its free end. In the present instance it is illustrated as having an exteriorly threaded free end 28 beyond a flange 29. This flange 29 serves as an abutment for a lighting fixture, or the like, against which a nut on the hollow stud 24 holds the fixture.

In order to mount the fixture securely on this stud 24, the flange 29 is preferably made with as large an area as is possible. However, this requirement is inconsistent with the requirement that the slot closing strip 13 fit as closely as possible around the stud 24, at the junction of the stud with the circular disks 23. The arrangement shown in FIGURE 5 allows the use of an abutment flange 29 of relative large area with a closing strip 13 that will fit neatly around the base of the stud.

The closing strip 13, in its mid portion, is formed with an opening 30 as wide as the flange 29 but having opposite arcuately shaped ends 30a that are spaced apart a distance less than the spacing between corresponding ends of the flange. The opening 30 is, however, of a length to closely engage opposite sides of the hollow stud 24 when the flexible strip 13 is trained around the periphery of the disks 23. In order to allow the ends 30a of the opening 30 to pass over the flange 29, a pair of notches 31 are formed beneath the flange on opposite sides of the hollow stud 24. Thus, as is shown in FIGURE 5, in order to mount this strip in its proper position in the final assembly, the threaded end 28 of the swivel member 12 is passed through the opening 30 until the strip contacts the flange 29. Then, the strip 13 is pulled on one end or the other until one of the ends 30a extends outwardly beyond the corresponding side of the flange 29. One end 30a of the opening 30 can then be passed beneath the flange 29 to be received in the notch 31, after which the flexible strip 13 can be moved in the other direction to permit passage of the other end 30a downwardly beneath the flange 29. The flexible strip 13 can then be pushed downwardly into position to engage to the peripheral edges of the disks 23.

As is apparent, in the completed joint, when the stud 24 is moved it carries the strip 13 with it. Obviously, the strip 13 is of sufficient length, on opposite sides of the stud 24, so as to fully close the housing slot 27 in both extreme positions of movement of the stud in the slot. In order to guide the strip 13 within the housing 10, the interiorly formed flanges 25 of the housing are spaced apart from confronting wall portions of the semicylindrical end of the housing to provide semicircular ways or guides 32, the spacing being such as to loosely confine that portion of the strip 13 which can be seen through the slot 27. The portions of the strip 13 which are not visible through the slot 27 are trained between the posts 18 and confronting portions of the wall of the housing 10 and the free ends of the strips may bear against the exterior of the conduit 11.

The housing 10, at its smaller end 22, is formed with an opening 33 of a size to rotatably support the corresponding end of the conduit 11. The other or inner end 34 of the conduit is formed with an external taper of frusto-conical configuration and extends into the space between the circular disks 23 of the member 12. The inner confronting faces 35 of the disks 23 are of a frusto-conical configuration also, for complementarily seating the tapered end 34 of the conduit 11. Accordingly, the tapered end 34 of the conduit 11 and the frusto-conical surfaces 35 of the member 12 are capable of bearing engagement in all adjusted positions of the conduit and stud member. Referring to FIGURE 2, in which the conduit's tapered end 34 and the surfaces 35 of the stud member 12 are in contact, it will be seen that the exposed end of the conduit 11 has an enlarged section 36 defining a shoulder 37 at its junction with the body of the conduit 11, which shoulder is spaced from the confronting end of the housing 10. Accordingly, as wear occurs on the contacting surfaces of the tapered end 34 and confronting surfaces 35 of the disks 23, the conduit 11 is capable of axial movement, under the pressure of the spring 14, to maintain the frictional contact of the surfaces and without limitation by the shoulder 37 except after an extremely long period of wear or use.

In order to provide a bearing surface on the conduit 11, for application of the force of the spring 14, the conduit is formed with a circumferentially extending flange 38, immediately behind the tapered end 34. The spring 14 is substantially U-shaped in configuration, having a web portion 39 from which a pair of arms 40 extend. The spacing between the spring arms 40 is such as to freely admit the body of the conduit 11 therebetween and the arms are of such length as to extend from one side of the housing 10 to the other. The spring 14 is made of a relatively stiff material and, as is best shown in FIGURE 3, the arms 40 are of convex-concave configuration to be arched towards and into contact with the confronting side of the flange 38, the arms bearing upon diametrically opposite portions of the flange.

One of the shells 16 and 17 is internally formed with a pair of abutments 41 against which the free ends of the spring arms 40 engage, on the side of the abutments facing the flange 38. The other of the housing shells is internally formed with a spaced pair of projecting abutment pins 42 against which the web portion 39 of the spring 14 is seated, on the sides of the pins 42 facing the flange 38 of the conduit 11. The conduit 11 is thus continuously and strongly biased against the disks 23 of the stud member 12. Preferably, the spring 14 is of such character as to exert sufficient force on the contacting surfaces of the conduit and stud member to make it difficult to manually rotate the stud member 12 by merely grasping the threaded end 28. However, in actual use when a fixture is connected to the threaded end 28 of the stud member 12, there will be sufficient leverage for readily overcoming the resistance of the spring 14, if the fixture is grasped at its outer end. With this arrangement, a strong spring, such as the spring 14, can be permanently concealed within the housing 10 to securely but yieldably maintain the several parts of the joint in their desired adjusted positions. As considerable allowance is made for wear, due to the axially movable characteristic of the conduit 11, a substantially permanent joint can be provided.

For limiting the possible twisting of conductors passing through the conduit 11 to within a range of 360°, whereby to avoid damage to the conductors, one of the housing shells 16 or 17 is interiorly provided with an inwardly projecting stop 43 positioned in the path of a similar stop 44 carried by the conduit 11.

For mounting the joint on the conduit stub 15, the enlarged end 36 of the conduit 11 may be interiorly tapped for threaded engagement with threads formed on the end of the stub 15 and a set screw 45 in the end 36 be tightened to hold the conduit 11 in relatively fixed position. The conductors will thus pass out the stub 15, through the conduit 11 and then through a bore 46 of the hollow stud 24, for ultimate connection to the fixture supported on the outer end of the stud. It will be observed that without the spring 14, a considerable amount of looseness and play would occur between the conduit 11, housing 10 and stud memer 12. However, the presence of the spring 14 insures a constant, firm contact of the several parts of the joint and, as a matter of fact, the several parts may be manufactured with a considerable tolerance factor and will nevertheless be maintained in snug contact with one another because of the heavy spring 14.

While but a single embodiment of my invention has been described herein, many variations from the specific details disclosed will undoubtedly occur to those skilled in the art. Accordingly, it is to be understood that I do not wish to be limited to the details hereinabove set forth but only by the spirit and scope of the following claims.

I claim:

1. In an electric universal joint, a housing formed with an arcuately extending slot at one end, a tubular conduit disposed in said housing and having an outer end protruding through one end of said housing and rotatably supported by said one end of said housing, a spaced pair of coaxially positioned disks having surface means providing rotative bearing engagement only with opposite interior surfaces of said housing and interconnected on a portion of their peripheral surfaces by a hollow stud, said stud extending through said slot of said housing, an inner end of said conduit and said pair of discs having complementarily shaped tapered surfaces to maintain contact with one another in all adjusted positions of said stud relative to said housing and conduit and of said stud and housing relative to said conduit, said pair of disks providing bearing support for said inner end of said conduit whereby said stud and housing can be angularly adjusted relative to the axis of said conduit, and spring means interposed between said housing and conduit to bias said conduit against said pair of disks, said conduit being axially movable into said housing by said spring means as wear occurs between said inner end of said conduit and said pair of discs whereby firm frictional contact between said inner end of said conduit and said pair of disks is maintained.

2. In an electric universal joint, an elongated housing formed at one end with an arcuately extending slot, a spaced pair of coaxially positioned disks having surface means providing rotative bearing engagement only with opposite interior surfaces of said housing and interconnected on a portion of their peripheral surfaces by a hollow stud, said stud extending through said slot of said housing, a conduit mounted in said housing for angular and axial movement relative to said housing and having one end directed toward and bearing against said pair of disks, said end of said conduit and said pair of disks having complementarily shaped tapered surfaces to maintain contact with one another in all adjusted positions of said stud and said conduit relative to said housing, and a generally U-shaped spring having a pair of arms between which arms said conduit extends, said spring being mounted within said housing adjacent a circumferentially extending flange formed on said conduit and on the opposite side of said flange from said one end of said conduit, said arms of said spring being arched to bear against diametrically opposite portions of said flange to draw said conduit inwardly of said housing to bias said one end of said conduit into engagement with said disks and to maintain such engagement as wear occurs on said complementarily shaped surfaces.

3. In an electric universal joint, an elongated housing formed at one with an arcuately extending slot subtending at least 180°, a pair of coaxial spaced apart disks interconnected on a portion of their peripheral surfaces by a hollow stud extending radially outwardly from said pair of disks, said disks on their outer faces each being formed with a circular flange rotatably receivable within one of a pair of cylindrical flanges interiorly formed on opposite walls of said housing, said cylindrical flanges being positioned coaxially with said arcuately extending slots whereby to support said stud for movement within said slot, said disks having confronting surfaces of frusto-conical configuration tapering radially inwardly from the peripheries of said disks toward one another, a cylindrical conduit within said housing having one end disposed in the space between said pair of disks, said one end of said conduit having an external taper of frusto-conical configuration complementary to said tapering, confronting surfaces of said pair of disks, said one end of said conduit having bearing support on said tapering, confronting surfaces of said pair of disks, the other end of said conduit extending through and having rotatable bearing support in an opening formed in the other end of said housing, a stop on said conduit within said housing and a stop interiorly formed on said housing, said pair of stops being positioned and arranged to prevent rotation of said conduit relative to said housing beyond 360°, a U-shaped spring having a pair of arms between which said conduit extends, said spring being mounted within said housing adjacent a circumferentially extending flange formed on said conduit and on the opposite side of said flange from said one end of said conduit, said arms of said spring being arched to bear against diametrically opposite portions of said side of said flange to draw said conduit inwardly of said housing to bias said one tapered end of said conduit into engagement with said tapered confronting surfaces of said pair of disks and to maintain such engagement as wear occurs in said disks or in said tapered end of said conduit, and a slot closure strip mounted on and carried by said pair of disks and said hollow stud to close said slot of said housing, said strip being supported interiorly of said housing along opposite longitudinally extending edges of said strip by semi-circular ways defined between said pair of cylindrical flanges of said housing and portions of said housing confronting said cylindrical flanges.

References Cited by the Examiner

UNITED STATES PATENTS

| | | | |
|---|---|---|---|
| 377,506 | 2/88 | Whiter | 285—209 |
| 412,940 | 10/89 | Aldcorn | 285—269 |
| 2,693,971 | 11/52 | Harrison | 285—269 |
| 2,709,097 | 5/55 | Leary | 285—165 |
| 2,771,309 | 11/56 | Clark | 285—268 |
| 2,841,417 | 7/58 | Mynick | 285—168 |
| 2,887,329 | 5/59 | Blakely | 285—404 |

FOREIGN PATENTS 366,476   7/06   France.

CARL W. TOMLIN, *Primary Examiner.*

THOMAS F. CALLAGHAN, *Examiner.*